F. RICHARD.
AUTOMOBILE BODY.
APPLICATION FILED APR. 29, 1915.
1,319,901.
Patented Oct. 28, 1919.
2 SHEETS—SHEET 2.
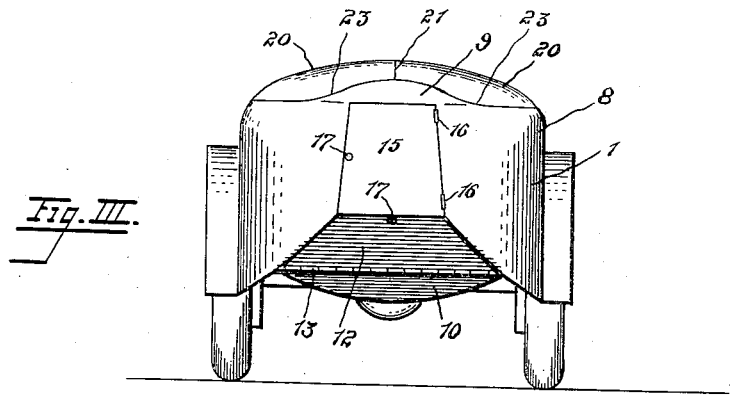
Fig. III.
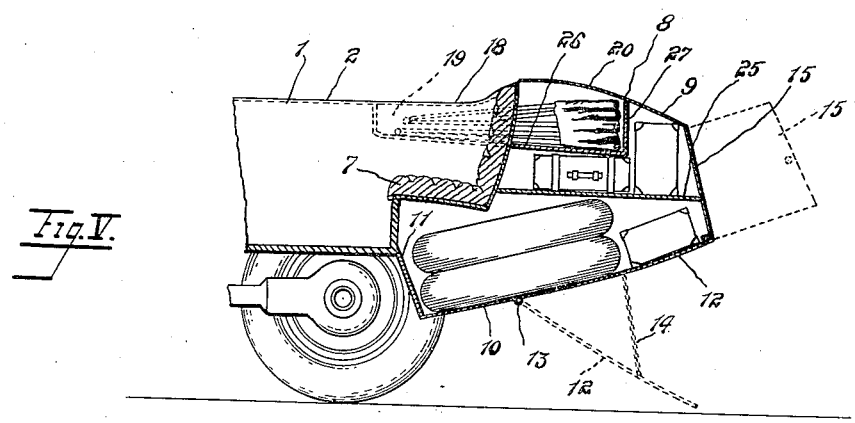
Fig. V.
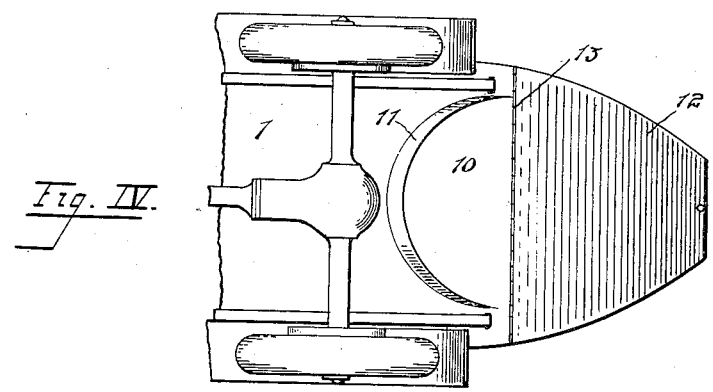
Fig. IV.
Witnesses:
Herman Eisele
J. N. Brady
Inventor:
François Richard
by his Atty,

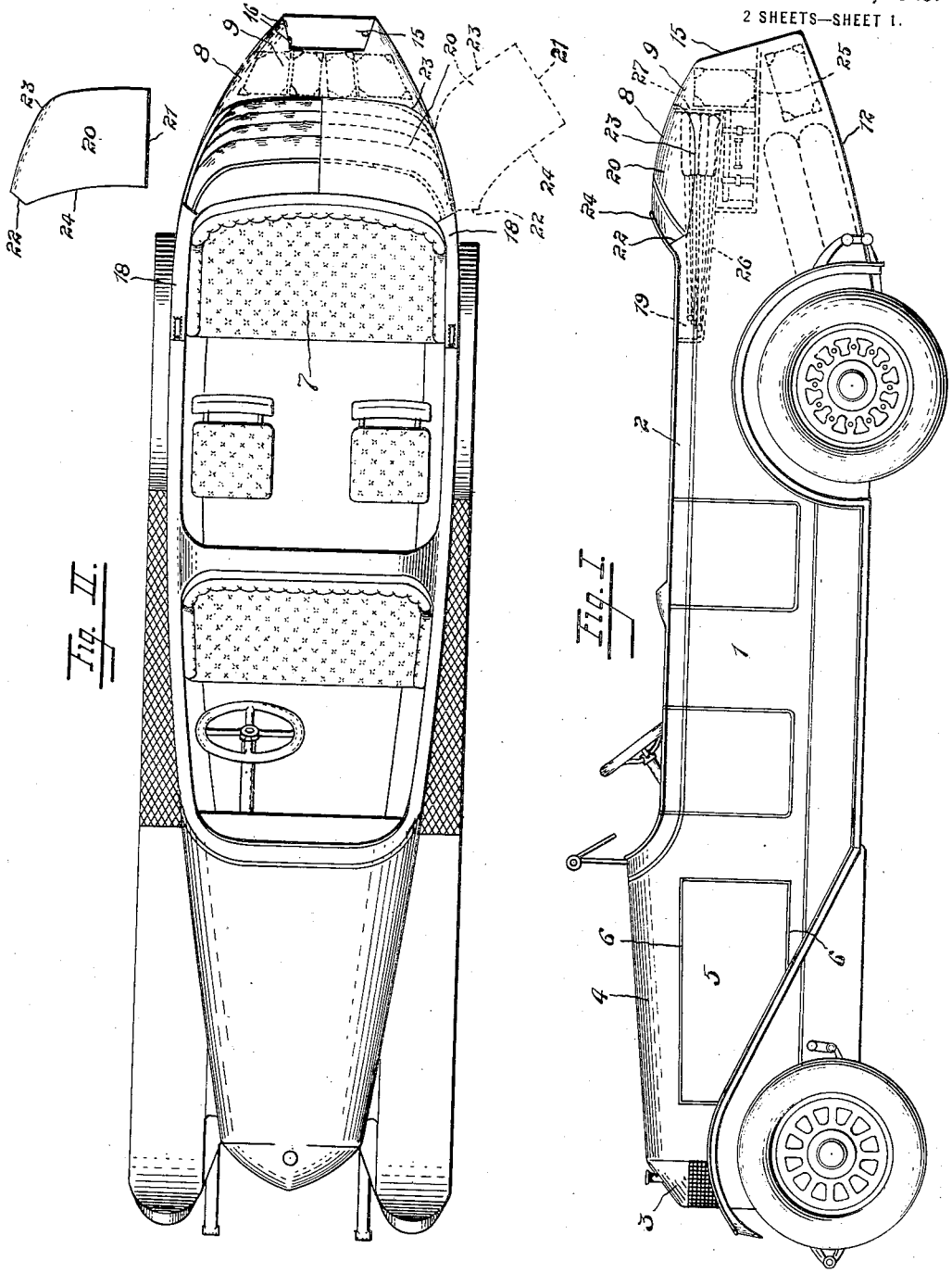

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

AUTOMOBILE-BODY.

1,319,901.  Specification of Letters Patent.  Patented Oct. 28, 1919.

Application filed April 29, 1915. Serial No. 24,728.

*To all whom it may concern:*

Be it known that I, FRANÇOIS RICHARD, a citizen of the French Republic, residing in the city of Cleveland and State of Ohio, have invented a new and useful Improvement in Automobile-Bodies, of which the following is a specification, the principle of the invention being herein explained and the best mode in which I have contemplated applying that principle so as to distinguish it from other inventions.

My invention pertains to automobile bodies and particularly to the utility of the exterior and interior configuration thereof. The object, besides ornamentation and feasibility of commercial manufacture, is to produce a body (1) which is compact and utilizes all interior space available, (2) which offers a minimum wind resistance, (3) which obviates dust swirls above and around the rear seat, (4) which accommodates within its confines the entire folded top, and (5) which provides closed compartments suitable for the retention and protection of tires and traveling cases.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Figure I is a side elevation of an automobile equipped with a body incorporating the several features of my invention.

Fig. II is a top plan of Fig. I.

Fig. III is a rear elevation.

Fig. IV is a bottom plan of such rear end.

Fig. V is a longitudinal section of the rear.

My present invention preferably involves a body 1 having a seat inclosing upper rim 2 of unitary structure such that the same may be lifted as an entirety from the chassis. The drawings exemplify this type of body suitably positioned against the rear of a radiator construction 3. The engine hood 4 of the body is of integral formation, converges in a forward direction and is otherwise of a natural curvature such as would ensue when properly fitted to the curvature of such parts as it is designed to abut. A panel 5 is provided on each end of the hood for movement along its edges 6 in order to permit of an inspection of the engine.

The rear tonneau seat is given the reference numeral 7 because it will be necessary later to refer to it in order to establish the relation of the content of the inventive features. A rear hooded compartment or poop 8 is of such exterior contour as will not only minimize wind resistance but also such rear end suction swirls as are occasioned by a rapidly moving vehicle. Specifically, the poop 8 involves a main inclosing member having rearwardly converging sides, the bottom edges of which curve upwardly and of which an intermediary top connecting portion 9 slopes downwardly in a rearward direction. The poop 8 adjoins the rear zigzag configuration of the seat 7 and furthermore includes in its structure a fixed bottom 10, which is directly below the seat and which has its forward edge 11 of arcuate formation whereby to utilize the available space just behind the rear axle. It is upon the bottom 10 that a pair of spare automobile tires are intended to be supported as clearly shown in Fig. V. A downwardly opening door 12 is pivoted at 13 to the rear edge of the bottom 10 and adapted in its open position to be held out of contact with the ground by means of a suspension chain 14 as indicated by the dotted lines in Fig. V. This door 12 when closed is adapted to additionally support rearwardly of the spare tires a suit case. A door 15 is operatively hinged at 16 to the poop 8 and in such a position that its lower edge conforms to the rear edge of the door 12. The open position of the door 15 is suggested by the dotted lines in Fig. V. Each of the doors 12 and 15 is provided with a knob, both of which have been designated with a numeral 17. Laterally adjacent to opposite sides of the seat 7 the rim 2 is provided with removable covers 18, beneath which the folding top is to be pivotally connected such that the plurality of braces thereof may be in part accommodated in a pair of compartments 19 therebeneath, and which latter are extensions merging into the confines of the poop 8. The poop 8 also involves a pair of laterally hinged covers 20 so shaped as to snugly fit between the rear of the seat 7 and the front of the portion 9. Such covers 20 have straight abutting edges 21, forecorner edges 22 designed to fit against the rear edges of the covers 18 respectively, convexly curved rear edges 23 designed to conform to the forward edge of the portion 9 and concavely curved forward edges 24 adapted to follow the rear contour of the seat 7. It should be understood that the poop 8 with its plurality of entryways is to be constructed so as to be as nearly dust proof as possible. Interiorly the poop 8 is provided about midway with a horizontally extending partition 25 which separates the compartment in which the tires are to be accommodated. About the partition 25 the poop 8 is provided with another right angular partition, including a horizontal portion 26 and an upright portion 27. The disposition of this last mentioned partition is such that it is designed to precisely inclose the folding top and permit of the insertion of another pair of traveling cases below and behind respectively.

Upon removal of the covers 18 and opening of the hinged covers 20 the top may be drawn up and thereafter both pairs of covers again put in place. The opening of the door 15 permits of manual access to any of the three traveling cases, while the opening of the door 12 permits the withdrawal of one or both of the reserve tires.

I claim:

An automobile body comprising a hollow poop located rearwardly of the rear seat of an automobile, said poop including a portion extending forwardly underneath such seat and designed to partially accommodate one or more spare tires, a substantially horizontal partition across said poop to form a tire compartment therebelow, a second partition above the first, and having both horizontal and upwardly extending sections, the space above the upper of said partitions being adapted to receive an entire folding top structure, a cover fitted over said space, a rear door affording access to the space between said partitions, and another downwardly swinging door in the bottom of said compartment whereby a minimum lifting of the tires into place therein is required and their withdrawal is gravitationally aided over said open depending door.

Signed by me, this 21st day of April, 1915.

FRANÇOIS RICHARD.